United States Patent [19]

Vincent

[11] 4,230,550

[45] Oct. 28, 1980

[54] RADIATION CURABLE BARRIER COATING HAVING FLEXIBILITY AND SELECTIVE GLOSS

[75] Inventor: Kent D. Vincent, Cupertino, Calif.

[73] Assignee: Hewlett-Packard Company, Palo Alto, Calif.

[21] Appl. No.: 64,290

[22] Filed: Aug. 6, 1979

[51] Int. Cl.$^2$ .................. C08F 2/50; C08F 120/10
[52] U.S. Cl. .................. 204/159.23; 260/42.29; 260/42.52; 260/42.53; 260/45.8 N; 526/261; 526/263; 428/522
[58] Field of Search .................. 526/261, 263; 204/159.11, 159.23

[56] References Cited

U.S. PATENT DOCUMENTS

| | | | |
|---|---|---|---|
| 3,020,255 | 2/1962 | Magrane et al. | 260/40 R |
| 3,852,302 | 12/1974 | Habermeier et al. | 526/263 |
| 4,082,635 | 4/1978 | Fritz et al. | 204/159.23 |
| 4,158,089 | 6/1979 | Loshaek et al. | 526/263 |

*Primary Examiner*—Walter C. Danison
*Attorney, Agent, or Firm*—Theodore S. Park

[57] ABSTRACT

A radiation curable barrier coating having chemical resistance to many solvents, flexibility when cured, selective gloss and excellent abrasion resistance at a coating thickness provided by lithographic printing methods comprises acrylated melamine resin in combination with silica fillers and photoinitiators.

13 Claims, No Drawings

RADIATION CURABLE BARRIER COATING HAVING FLEXIBILITY AND SELECTIVE GLOSS

BACKGROUND AND SUMMARY

The list of conventional chemical compositions for protective coatings includes resin two component systems, solvent based systems and combinations thereof. Urethanes, phenolics, melamines and urea-formaldehyde are examples of resin systems. Several parameters characterize resin systems. In general, these coatings are two component systems, some containing additional catalysts. The two components react together either with heat or through the action of a catalyst or both. Systems reacting at room temperature are usually appreciably toxic, as in the case of two-part urethanes containing typically polyols and multi-functional isocyanates. Compositions which are room temperature stable have low toxicity, but react at elevated temperatures such as phenolics and cannot be used in most cases with temperature sensitive substrates.

A second group of protective coatings is solvent based and provides solution of high molecular weight polymer solids into a liquid coating by way of a solvent. This group includes polyurethanes, acrylics and enamels for example. Once applied, the coating becomes solid by evaporation of the solvent. Many of the foregoing problems of temperature and toxicity associated with resin systems can be reduced or eliminated by solvent systems, but the resultant physical properties of the coating lack a broad range of chemical resistance due to their lack of crosslinking.

The introduction of ultraviolet and electron beam curable resins have eliminated many of the forementioned deficiencies of conventional coating systems wherein resin systems polymerize and crosslink in situ without a need for conventional solvents, catalysts or heat. The radiation curable resins typically contain alkene reactive groups which react through high energy-free radical initiation. The vast majority of these systems are acrylated epoxies and acrylated urethanes many of which have been formulated for protective coatings, some with excellent abrasion resistance. The exact formulation of these new systems has not been publicly disclosed, but their physical properties have been measured. Typically, abrasion resistance and chemical resistance of these coatings are a function of coating thickness. A coating thickness of one of two mils is normally required to achieve desired properties. Chemical resistance in many cases is proportional to brittleness, the most flexible coatings having the least chemical resistance.

The requirement for a barrier coating having chemical resistance to a wide range of potent solvents yet having flexibility when cured and having excellent abrasion resistance at a coating thickness provided by lithographic printing led us to the development of the present invention. Although melamine resins have found wide use in protective coatings due to their clarity, abrasion and chemical resistance, melamine acrylate has been used as a reactive solvent. Melamine acrylate is a liquid of too low viscosity for lithographic processing and when fully cured via free radical initiation forms a brittle coating. In my effort to find a lithographic formulation providing a flexible coating I discovered that a combination of certain micronsized synthetic silicas, photoinitiators and melamine acrylate provide the desired properties. The silicas are chemically inert and are essentially transparent in the visible and near ultraviolet spectra making them ideal as fillers for a radiation curable barrier. Their particle size and hardness are varied to adjust the gloss of a cured coating. I have found acrylated melamine resin in combination with certain silica fillers and photoinitiators to provide a combination of application and cured coating properties superior in most cases to conventional and radiation curable resins. The advantages include a 100% solid composition which does not require solvents, rapid cure with essentially no heat build up in substrates, easy application to up to 10 micron thickness with lithoprinting processes, and a resulting barrier coating having physical flexibility and excellent chemical and abrasion resistance.

DESCRIPTION OF THE PREFERRED EMBODIMENT

The main ingredient of the preferred coating is trimethoxymethyltri-2-ethoxy-acrylate methyl malamine, herein referred to as melamine acrylate, depicted by the following structural formula:

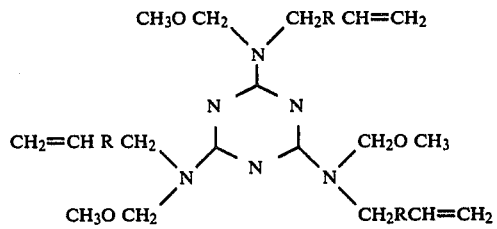

trimethoxymethyltri-2-ethoxyacrylatemethyl melamine (melamine acrylate).

My preferred formulations by percent weight for sixty percent gloss coating:
- 89% melamine acrylate
- 3% Syloid 166 silica (W. R. Grace & Co.)
- 3% Syloid 385 silica (W. R. Grace & Co.)
- 1% benzophenone
- 1% diethoxyacetophenone
- 1.5% triethanolamine
- 1.0% Cyastat LS (Cyanamid Co.)
- 0.5% Bis (2,2,6,6-tetramethyl-piperidinyl-4) Sebacate The reaction of several parts (preferably three parts) of hydroxyethylacrylate or other hydroxyl, carboxyl or amide containing alkene with hexamethoxymethyl melamine to form a melamine ring having pendant alkene chemistry and allowing the melamine to cure into a resin via a free radical polymerization mechanism is well known and described for example in U.S. Pat. No. 3,020,255. U.S. Pat. No. 3,020,255 is hereby fully incorporated by reference.

I have found that a six to eight percent by weight incorporation of silicas greatly increases the viscosity of the melamine acrylate making the combination ideal for lithographic coating application while at the same time allowing for a controlled gloss of 60 percent to 35 percent gloss (60° measuring angle) for the reactive additions. These synthetic silicas are micron-sized particles and are readily available from several manufacturers; e.g., W. R. Grace, Philadelphia Quartz Company, in various grades. Particle size is typically 0.005 micron to 25 microns in diameter. The preferred diameter for a matte surface coating is 2–5 microns.

A combination of photoinitiators and a photosynergist have been found to be most beneficial for photoinduced polymerization and free radical generation. Since acrylates are appreciably oxygen inhibited a combination of approximately 1 percent by coating weight benzophenone and 1.5 percent of a tertiary amine such as triethanol amine have shown to give good surface cure when the coating is ultraviolet radiation cured in an air (oxygen containing) environment. For through cure a 1 percent by weight addition of diethoxy-acetophenone has shown fast cure characteristics. The types of photosynergists to be utilized include compounds containing easily abstracted hydrogen. Particularly reactive H-donars are those in which the active H-atom is positioned alpha to an oxygen, as in alcohols and ethers, to a nitrogen, as in tertiary amines, or to sulfur as in thiols. Among the most commonly used photosynergists dimethylethanol amine, methyldietranol amine and triethanol amine have been found to be the most reactive.

Other trace additives have been found to enhance the properties of the cured coating. The addition of anti-static agents has been found beneficial when plastic films are coated. There are a number of compounds suitable for anti-static agents. I have found the best to be quarternary ammonium compounds, e.g., stearamidopropyldimethyl-hydroxyethylammonium benzoate, tetraethylammonium acetate, (3-lauramidopropyl) trimethylammonium methylsulfate (Cyastat LS, Cyanamid). I have found a 1 percent addition of an olefinic quarternary ammonium compound, e.g., (3-lauramidopropyl) trimethylammonium methyl sulfate trade named Cyastat LS by American Cyanamid, to be particularly satisfactory for this purpose.

The tertiary amine photosynergists mentioned previously oxidize to form colored by products with ultraviolet radiation (U.V. hereafter) exposure. I have found a 0.5 percent addition of a hindered amine light stabilizer such as Bis (2,2,6,6-tetramethylpiperidinyl-4) Sebacate trade named Tinivun 770 by Ciba-Geigy to greatly enhance the non-yellowing properties of the novel coating composition. Apparently this material reacts to chemically subtract yellowing from a resin which has yellowed. Most other compounds prevent yellowing by working as ultraviolet radiation absorbers, effectively limiting the degree of ultraviolet exposure seen by the host resin. These latter compounds are less preferable for ultraviolet curable coatings since ultraviolet exposure is a necessity for resin cure.

This composition is preferably made by dissolving first the benzophenone into the melamine acrylate at about 50° C. The silicas are then dispersed into the mixture at moderate shear not to exceed 70° C. Next the antistatic agent, light stabilizer and diethoxyacetophenone are dispersed into the mixture at moderate shear. Once a uniform mixture is obtained, the tertiary amine photosynergist is incorporated at low shear holding the mixture temperature below 50° C. The finished coating is then allowed to cool and wet out prior to application.

I have found that the physical properties of the cured resin are excellent in the 10 micron thickness range, the thickness of approximately two to three lithographic printings. Under proper conditions of cure, my coating has shown Taber losses of 8–10 mg when tested with a CS-17 wheel, 1000 g load for 1000 cycles which is very abrasion resistant and is roughly four times more abrasion resistant than the standard Polane two-part urethane coating of much greater thickness.

The chemical resistance to solvents of this cured coating has also been found to be excellent. A thirty minute solvent saturated cotton swab exposure to such solvents as pyridine, methylethyl ketone, methylene chloride, tetrahydrofuran, isopropanol, dimethyformamide, acetonitrile, dioxane, ethylacetate, point 1 normal Hydrochloric acid, carbon disulfide, ether, 6% caustic etch, chloroform and benzene have shown little or no effect on the coating.

The lithographic printing qualities of my coatings are also excellent. The coating does not appear to appreciably emulsify with the water based etch solution used for printing. The coating spreads uniformly on the printing rollers and deposits uniformly on the substrate being coated. The coating can be printed in an analogous manner to conventional printing inks giving very high resolution printed detail. These litho properties are particularly advantageous in allowing the ability to selectively print areas of different gloss values on the substrate. For example, when the coating is used to protect an instrument front panel a high gloss coating containing six percent silica and producing 60% gloss can be printed over display window areas, and a low gloss coating containing eight percent silica and producing 35% gloss can be printed over the rest of the instrument front panel. In this manner, the diffusion effect of the matte surface is minimized in areas needing to transmit optical information (e.g. L.E.D. displays) while the rest of the front panel still maintains a desired gloss reading.

The current coating formulation cures at roughly 120 feet per minute belt speed when the printed sheet is passed under three Hanovia type reflectors with 200 watt per inch mercury vapor lamps. The high speed and lack of substantial absorbed heat allowed by the U.V. cure process provide a process particularly useful for thermally sensitive substrates such as plastic film. When several coatings are needed, the U.V. process allows the ability to immediately recoat without loss in registration due to the expansion, contraction or permanent shrinkage induced by conventional heat processes.

Additionally, the coating is flexible and moderately formable. I have subjected a coated piece of 0.015 inch polycarbonate to approximately 0.015 inch radius bends without cracking or otherwise reducing the cured properties of the coating.

I claim:

1. A composition of matter for application as a barrier coating, said composition consisting essentially of:
   trimethoxymethyl tri-2-ethoxy acrylate methyl melamine;
   silica; and
   a photoinitiator.

2. A composition as in claim 1 wherein trimethoxymethyl tri-2-ethoxy acrylate methyl melamine comprises greater than 50% by weight of the composition.

3. A composition as in claim 1 comprising an antistatic agent.

4. A composition as in claim 1 comprising a hindered amine stabilizer.

5. A composition as in claim 3 wherein the antistatic agent is (3-lauramidopropyl) trimethyl ammonium methyl sulfate.

6. A composition as in claim 4 wherein the hindered amine stabilizer comprises Bis (2,2,6,6-tetramethylpiperidinyl-4) Sebacate.

7. A composition of matter for printing of selective glosses on a substrate, said composition consisting essentially of:
   trimethoxymethyl tri-2-ethoxy acrylate methyl melamine;
   silica; and
   a photoinitiator.

8. A composition as in claim 7 wherein trimethoxymethyl tri-2-ethoxy acrylate methyl melamine comprises greater than 50% by weight of the composition.

9. A composition as in claim 7 comprising an antistatic agent.

10. A composition as in claim 7 comprising a hindered amine stabilizer.

11. A composition as in claim 9 wherein the antistatic agent is (3-lauramidopropyl) trimethyl ammonium methyl sulfate.

12. A composition as in claim 10 wherein the hindered amine stabilizer comprises Bis (2,2,6,6-tetramethyl-piperidinyl-4) Sebacate.

13. A composition of matter for application as a coating, said composition consisting essentially of:
   a melamine ring containing at least one pendent allylic group;
   a silica solid; and
   a photoinitiator.

* * * * *

UNITED STATES PATENT AND TRADEMARK OFFICE
CERTIFICATE OF CORRECTION

PATENT NO. : 4,230,550
DATED : October 28, 1980
INVENTOR(S) : Kent D. Vincent

It is certified that error appears in the above-identified patent and that said Letters Patent are hereby corrected as shown below:

Column 1, line 48, delete "one of two" and substitute --one to two--;

Signed and Sealed this

Fifteenth Day of September 1981

[SEAL]

Attest:

GERALD J. MOSSINGHOFF

Attesting Officer     Commissioner of Patents and Trademarks